G. F. CLARK.
CUP AND APRON.
APPLICATION FILED SEPT. 24, 1910.
980,204.
Patented Jan. 3, 1911.
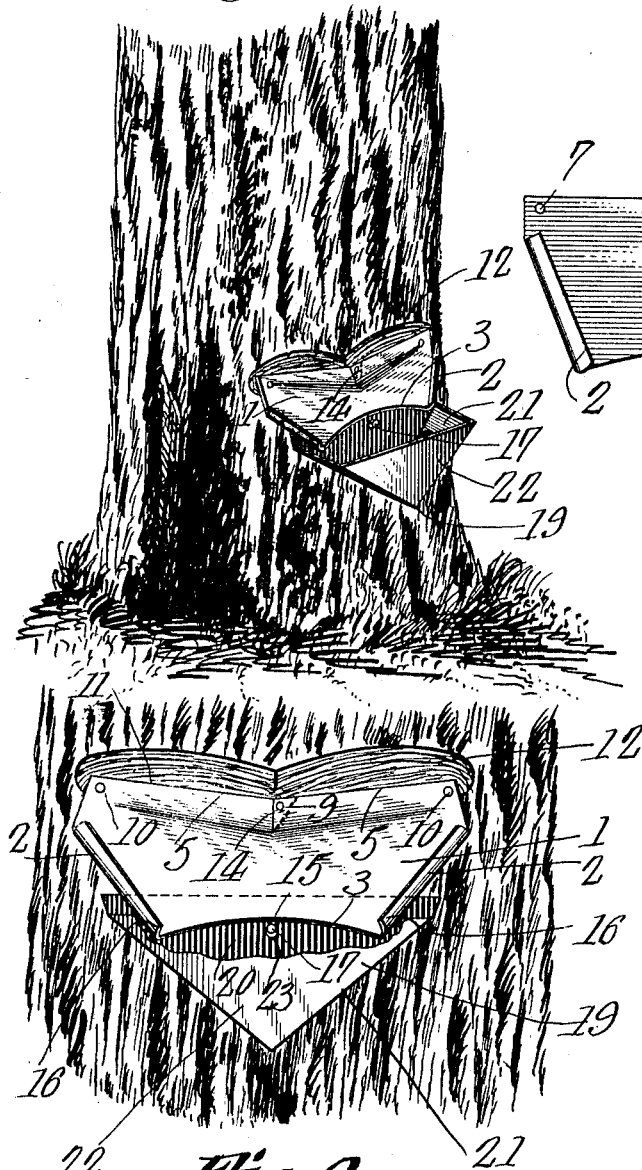
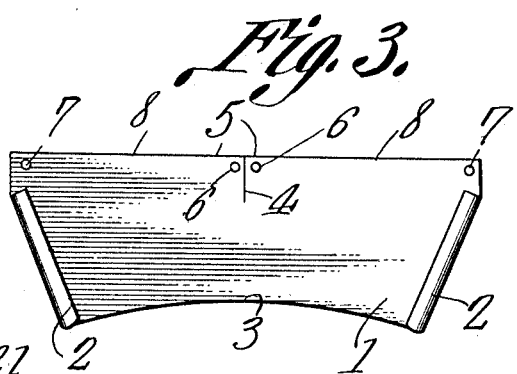
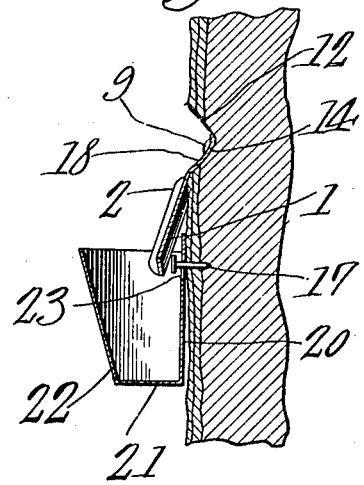
George F. Clark, Inventor
by C. A. Snow & Co., Attorneys
Witnesses

UNITED STATES PATENT OFFICE.

GEORGE FLOURNAY CLARK, OF CROSLAND, GEORGIA.

CUP AND APRON.

980,204.  Specification of Letters Patent.  Patented Jan. 3, 1911.

Application filed September 24, 1910. Serial No. 583,618.

*To all whom it may concern:*

Be it known that I, GEORGE FLOURNAY CLARK, a citizen of the United States, residing at Crosland, in the county of Colquitt and State of Georgia, have invented a new and useful Cup and Apron, of which the following is a specification.

The device forming the subject matter of this application, embraces an apron and a cup, of the sort commonly employed in the collection of resinous gums for the manufacture of turpentine and the like.

It is the object of this invention to provide an apron of novel and improved form, so constructed that the same may readily be adapted to the hack in the tree.

Another object of the invention is to provide a cup of novel and improved form, the cup and the apron coöperating in such a way that the contents of the apron will readily be deflected into the cup, neither the cup nor the apron being likely to be accidentally displaced from the tree upon which the same are mounted.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in perspective, applied to a tree trunk; Fig. 2 is a front elevation, parts being broken away; Fig. 3 is a plan of the apron, previous to its application to the tree; and Fig. 4 is a vertical transverse section.

The apron 1 has its lateral edges bent inwardly to form downwardly converging deflectors 2. The lower edge of the apron 1 is curved toward the upper edge, as denoted by the numeral 3. The apron is slit, transversely, adjacent its upper edge, as shown at 4, to divide the upper edge of the apron 1 into segments 8, and to form tongues 5 upon each side of the slit 4. In these tongues 5, adjacent the slit 4, there are holes 6, and other holes 7 are fashioned in the apron 1, adjacent the upper edge thereof.

The apron 1 is flexible, to allow the tongues 5 to overlap, as shown at 14, thus alining the holes 6 to receive a nail 9, other nails 10 being insertible into the openings 7. The overlapping of the tongues 5 causes the segments 8 of the upper edge of the apron to be disposed at an obtuse angle to each other, as shown at 11, thus causing the apron at its upper edge, to fit within the pointed hack 12 in the tree.

The culminating point 15 of the curved lower edge 3 of the apron is disposed above the lower ends 16 of the deflectors 2. By this construction, a nail 17, adapted to support the cup 19, hereinafter described, may be driven into the tree, in close proximity to the curved edge 3, and above the lower ends 16 of the deflectors 2. As shown in Fig. 4, and there denoted by the numeral 18, the upper portion of the apron 1, above the deflectors 2, may be rearwardly curved, so as to fit smoothly and evenly into hack 12.

The cup 19 comprises a rear wall 20, the side walls 21 converging downwardly to an apex, and a front wall 22. The rear wall 20 upstands slightly above the upper ends of the side walls 21, and in the rear wall 20 there is a hole 23, positioned below the upper ends of the side walls 21, this hole 23 being adapted to receive the nail 17.

Owing to the fact that the lower edge 3 of the apron 1 is curved, as shown, and owing to the fact that the hole 23 in the rear wall 20 of the cup 19 is located below the lower ends of the side walls 21 of the cup, when the cup 19 is suspended upon the nail 17, the lower ends 16 of the deflectors 2 will be located below the upper ends of the side walls 21 of the cup, and within the contour of the cup, thus securing a proper drainage from the apron into the cup. Moreover, by this construction, the rear wall 20 of the cup extends upwardly behind the apron 1, thus preventing the cup 19 from being accidentally removed from the depending nail 17. The apron 1 is rigidly secured in the hack 12, and neither the apron 1 nor the cup 19 is likely to be accidentally displaced, either by the wind, or by stock brushing against the device.

Owing to the fact that the side walls 21 of the cup converge as they extend downwardly, the cup will not burst, should the contents thereof become frozen.

Owing to the fact that the cup 19 is pivoted independently of the apron 1, the cup will at all times hang in a position in which the maximum capacity of the cup will be available. Thus, although the hack 12 be irregularly fashioned in the tree, the apron 1 consequently inclining to one side, the cup 19, being independently pivoted, will hang level and receive and hold its maximum load.

When the contents of the cups 19 are being collected, the cups may readily be removed, for emptying, without disturbing the position of the aprons 1 upon the trees.

Having thus described the invention, what is claimed is:—

In a device of the class described, an apron having its lower edge curved toward its upper edge, the lateral edges of the apron being bent to form downwardly converging deflectors; the apron being transversely slit adjacent its upper edge, to divide the upper edge into segments, and to form tongues, the tongues being provided with openings upon opposite sides of the slit, the apron being flexible to overlap the tongues, whereby the openings will be alined to receive a nail, and to dispose the segments of the upper edge at an obtuse angle to each other.

In testimony that I claim the foregoing as my own, I have hereto affixed my signature in the presence of two witnesses.

GEORGE FLOURNAY CLARK.

Witnesses:
J. B. MONK,
A. B. BUXTON.